United States Patent [19]

Dorot

[11] 4,126,299
[45] Nov. 21, 1978

[54] BRAKE AND A CONTROL APPARATUS FOR THE OPENING OF A BRAKE

[75] Inventor: Henri Dorot, Wattignies, France

[73] Assignee: Verlinde S.A., Loos, France

[21] Appl. No.: 806,477

[22] Filed: Jun. 14, 1977

[30] Foreign Application Priority Data

Jun. 14, 1976 [FR] France .................................. 7618737

[51] Int. Cl.² ............................................ B66D 1/00
[52] U.S. Cl. .................................. 254/186 R; 188/134
[58] Field of Search .............. 254/186 R, 150 R, 168; 188/134, 18 A, 71.1

[56] References Cited

U.S. PATENT DOCUMENTS

| 3,701,401 | 10/1972 | Palma et al. | 188/134 |
| 3,866,725 | 2/1975 | Greutter | 188/134 |
| 3,870,129 | 3/1975 | Arnold | 188/134 |
| 3,994,476 | 11/1976 | Gennep | 188/134 |
| 4,009,770 | 3/1977 | Schreyer | 188/134 |

Primary Examiner—Trygve M. Blix
Assistant Examiner—Kenneth Noland
Attorney, Agent, or Firm—Cameron, Kerkam, Sutton, Stowell & Stowell

[57] ABSTRACT

A brake and apparatus for control of the brake are provided in which a support for the fixed parts of the brake requires no jack connecting to a fixed base. The fixed base and support include two stops on one and a finger on the other cooperating with the stops to determine the maximum angle of oscillation of the support with respect to the base. The construction is particularly useful for brakes for winches and primarily for winches controlled hydraulically.

4 Claims, 1 Drawing Figure

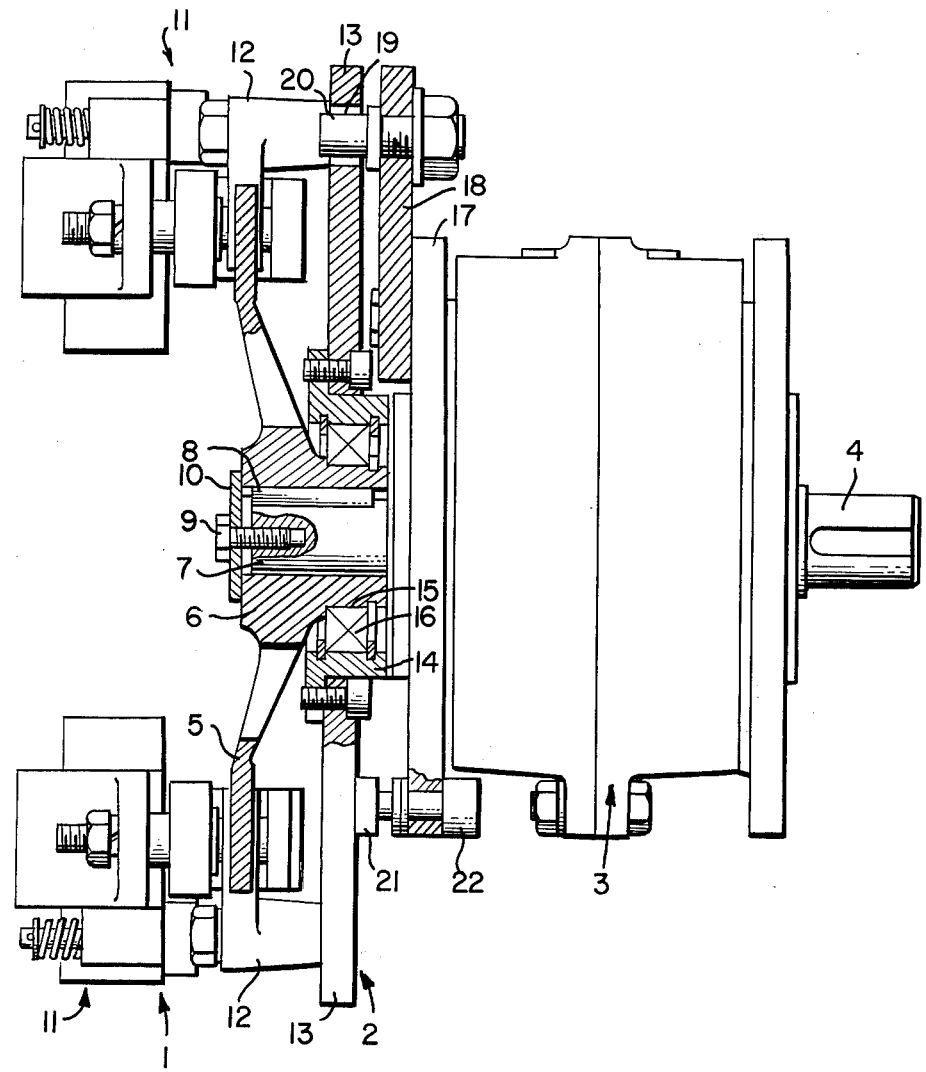

BRAKE AND A CONTROL APPARATUS FOR THE OPENING OF A BRAKE

BACKGROUND OF THE INVENTION

The invention relates to a brake and control apparatus for the opening of a brake primarily for a winch and more particularly but not exclusively for a lifting winch controlled hydraulically.

For this hydraulic control it is known to utilize a pump, generally of variable flow, feeding a motor whose shaft is connected in rotation directly or through a reduction means to the control shaft of a winch.

In the case of a lifting winch, the action of the weight of the suspended charge naturally tends to cause the descent of the charge and because of this to cause rotation in the corresponding direction of the motor shaft until the flow form the pump is sufficient to compensate for the losses of the circuit.

Also, in view of the blocking of the charge at the end of each of its movements of ascent or descent, such a winch is provided with a brake acting on a piece connected in rotation with the winch.

When after such a blocking of the charge the movement to be obtained is a descent, the weight acting in the same direction as this movement, the brake can, without inconvenience, be opened before the motor is sufficiently fed, for, if necessary, control of this descent.

On the other hand, in the case where the movement to be obtained is an ascent, the weight then acts in the opposite sense to the movement and should the opening of the brake occur only a short time before the motor provides the necessary couple to counterbalance the charge, a harmful blow to the winch could occur and to its charge by causing a free fall before the ascent.

From this fact, it is indispensable, at least for the ascent movements of the charge, to provide control apparatus of the opening of the brake which permits this opening only upon equilibrium of the charge by the motorcouple and, in the case of hydraulic control, upon a sufficient flow from the pump.

To obtain this result, it is known to place in opposition on the same "piece" two couples of rotation comprising:

one couple, obviously, created by the traction of the charge to be balanced; and the other couple, by the force of a direct action jack the chamber of which is in communication with the feed circuit of the motor.

The "piece" thus subjected to these two couples then provides a balance which rotates in one direction by compressing the chamber of the jack when the couple of the charge is greater and thus primarily at the end of each movement and then in the reverse direction under the action of the jack as soon as the pressure in the chamber of the jack passes the equilibrium point of the charge.

It is then sufficient, during the course of displacement of the "piece" and of its jack, to act directly or indirectly through one of these elements on a contact or control valve controlling the opening of the brake.

To make up this "piece" it is known to utilize the support of the control elements of the winch such as the motor, reduction gear, or brake and to mount this support in such a way that it can oscillate around the axis of the winch under the action of the rotational couple due to the charge while compressing the direct action jack which connects the support to a fixed point.

This construction requires the rotation of a large mass of the support and of the control elements for the winch, implicitly and unfortunately requiring an enlarging of the elements and primarily of the jack and causes a certain delay in the functioning.

In an attempt to correct these inconveniences in another embodiment, the "piece" is limited to the support of those of the elements of the brake which normally are associated with a fixed base and this support is, with respect to the fixed base carrying the winch, mounted freely in rotation in the limits of extension and compression of the jack referred to above.

This jack, which, in accordance with the construction of known devices, is an essential element to control the opening of the brake, greatly increases the cost of the construction and limits the application of such apparatus to a brake for a winch controlled hydraulically.

SUMMARY OF THE INVENTION

The present invention relates to a brake and control apparatus for the brake of the general type discussed above comprising a "piece", formed by the support of those of the elements of the brake which are normally fixed to a fixed base, which is mounted for oscillation on an axis to control, directly or indirectly, the control element of the brake but which does not have the inconveniences discussed above.

The object of the invention is therefore such apparatus which in its operation does not require a costly jack limiting its utility.

To this end, the present invention has for its object such a brake and control apparatus for the opening of the brake characterized in that the support does not require a jack connecting it to the fixed base and in that the support and the base include two stops on one and a finger on the other cooperating with the stops to determine the maximum angle of oscillation of the support.

REFERENCE TO THE ACCOMPANYING DRAWING

The present invention will be clearly understood from the following description of a preferred embodiment thereof which is described hereinafter, by way of example and not by way of limitation, with respect to the FIGURE of the accompanying drawing which shows in partial cross section a brake in accordance with the present invention.

DESCRIPTION OF THE PREFERRED EMBODIMENT

A brake 1 and control arrangement 2 for the opening of the brake are associated at an end of a shaft 4 on one side of a motor 3. On the other side of motor 3 the other end of shaft 4 is connected in rotation directly or through a reducer to the control shaft of a winch which is not shown.

The brake is of the type having a rotor disc 5, the hub 6 of which is keyed on the end of shaft 7 of the motor for rotation and in translation by a key 8 and screw 9 with washer 10.

Disc 5 is gripped at at least one point by a pair of shoes 11 actuated for example, hydraulically or electrically.

Each pair of shoes is associated with a foot 12 fixed on support 13, the center 14 of which is centered on a recessed portion 15 of hub 6 of the disc by a roller bearing 16 permitting disc 5 to turn independently of support 13.

In accordance with the essential characteristic of the invention, support 13 does not require a connecting jack to a fixed point such as, for example, base 17, the housing of motor 3 or a cramp 18 secured to the base or to the motor housing.

To limit oscillation, and to permit braking to occur, either support 13 or a fixed part such as cramp 18 have an opening or slot 19 and the other a finger 20 engaging in slot 19. The extreme ends of slot 19 provide stops determining the angle of oscillation.

When the winch is stopped, the brake being closed, the charge forces the support against one of the stops.

When the motor is fed for the control of an ascending movement, the increase of the value of the motor couple causes the rotation of the motor and of the disc with the support until the charge is in equilibrium.

This rotation would continue with the brake remaining closed until arrival of the finger 20 on the stop opposite to the preceding stop.

To open the brake prior to engagement of this last stop to permit the disk to rotate alone, support 13 and a fixed piece such as base 17 or the housing of motor 3 include a cam 21 and the other includes control apparatus 22 for opening the shoes of the brake.

Because of the structure in accordance with the present invention, the driving action of the support is furnished directly by the motor without requiring a special jack and the brake and its control apparatus are therefore very much simplified and less costly.

Further, the present structure can be used with other machines than winches with hydraulic control and, for example, with electric motors.

I claim:

1. A brake and apparatus for controlling the opening of the brake primarily for a winch and more particularly for a lifting winch driven hydraulically comprising:
   a shaft,
   a brake rotor keyed on said shaft, a motor shaft connected to said shaft and constantly urged in rotation in the same direction by the action of a force primarily a traction force due to a charge,
   a fixed base, a support on said base for supporting other braking elements of the brake and where said braking elements are fixedly and directly coupled to said support, said support oscillating around said shaft for said rotor,
   first means for controlling the brake, second means for actuating said first means, said first means being associated with said support and said second means being associated with said fixed base, said support and said base including two spaced stops on one and a finger on the other cooperating with said stops determining the maximum angle of oscillation of said support relative to said fixed base.

2. Brake and apparatus in accordance with claim 1, said two stops being the extreme ends of a slot receiving said finger.

3. A brake and apparatus for controlling the opening of the brake primarily for a winch and more particularly for a lifting winch driven hydraulically comprising:
   a shaft,
   a brake rotor keyed on said shaft, a motor shaft connected to said shaft and constantly urged in rotation in the same direction by the action of a force primarily a traction force due to a charge,
   a fixed base, a support on said base for supporting other braking elements of the brake and where said braking elements are fixedly and directly coupled to said support, said support oscillating around said shaft for said rotor,
   first means for controlling the brake, second means for actuating said first means, said second means being associated with said support and said first means being associated with said fixed base, said support and said base including two spaced stops on one and a finger on the other cooperating with said stops determining the maximum angle of oscillation of said support relative to said fixed base.

4. Brake and apparatus in accordance with claim 3, said two stops being the extreme ends of a slot receiving said finger.

* * * * *